US011970902B2

(12) United States Patent
Yu et al.

(10) Patent No.: US 11,970,902 B2
(45) Date of Patent: Apr. 30, 2024

(54) ROTARY POSITIONING ADJUSTMENT DEVICE AND CURTAIN WITH THE SAME

(71) Applicant: LANTEX WINDOW FASHIONS CO., LTD, Zhejiang (CN)

(72) Inventors: Jianming Yu, Zhejiang (CN); Binglu Qiu, Zhejiang (CN); Chaozhong Wang, Zhejiang (CN)

(73) Assignee: LANTEX WINDOW FASHIONS CO., LTD, Zhejiang (CN)

( * ) Notice: Subject to any disclaimer, the term of this patent is extended or adjusted under 35 U.S.C. 154(b) by 301 days.

(21) Appl. No.: 17/761,323

(22) PCT Filed: Sep. 14, 2020

(86) PCT No.: PCT/CN2020/114949
§ 371 (c)(1),
(2) Date: Mar. 17, 2022

(87) PCT Pub. No.: WO2021/052275
PCT Pub. Date: Mar. 25, 2021

(65) Prior Publication Data

US 2022/0341258 A1 Oct. 27, 2022

(30) Foreign Application Priority Data

Sep. 17, 2019 (CN) ........................ 201910875903.7

(51) Int. Cl.
*E06B 9/60* (2006.01)
*E06B 9/80* (2006.01)

(52) U.S. Cl.
CPC . *E06B 9/60* (2013.01); *E06B 9/80* (2013.01)

(58) Field of Classification Search
CPC ................. E06B 9/60; E06B 9/80; E06B 9/56
See application file for complete search history.

(56) References Cited

U.S. PATENT DOCUMENTS

| | | | | |
|---|---|---|---|---|
| 4,444,242 A * | 4/1984 | Amsler | E06B 9/32 160/172 R |
| 2016/0083999 A1* | 3/2016 | Chen | E06B 9/50 160/315 |
| 2018/0112461 A1* | 4/2018 | Holt | E06B 9/80 |
| 2019/0218859 A1* | 7/2019 | Campagna | E06B 9/90 |

(Continued)

FOREIGN PATENT DOCUMENTS

| | | | |
|---|---|---|---|
| CN | 203879365 U * | 10/2014 | E06B 9/42 |
| CN | 205036278 U * | 2/2016 | |
| CN | 205206710 U * | 5/2016 | |

(Continued)

*Primary Examiner* — Beth A Stephan

(57) ABSTRACT

A rotary positioning adjustment device includes a shaft sleeve and a connecting rod. A reel is fixedly connected with an end of the connecting rod; a fixed seat is sleeved on the connecting rod; the reel is arranged in the fixed seat; and a power storage assembly is installed in the shaft sleeve. The power storage assembly includes a power input piece, a second torsion spring and a power output piece; a first support leg of the second torsion spring is connected in a hooked mode with one side of an input block of the power input piece, and a second support leg of the second torsion spring is connected in a hooked mode with the other side of the input block. A curtain includes the rotary positioning adjustment device.

20 Claims, 10 Drawing Sheets

(56) References Cited

U.S. PATENT DOCUMENTS

2021/0214996 A1 * 7/2021 Kwak ..................... E06B 9/384

FOREIGN PATENT DOCUMENTS

| | | | | | |
|---|---|---|---|---|---|
| CN | 107842303 A | * | 3/2018 | ............... | E06B 9/15 |
| CN | 208347649 U | * | 1/2019 | | |
| CN | 110454072 A | * | 11/2019 | ............... | E06B 9/60 |
| CN | 211397384 U | * | 9/2020 | ............... | E06B 9/60 |
| WO | WO-2021052275 A1 | * | 3/2021 | ............... | E06B 9/60 |

* cited by examiner

ROTARY POSITIONING ADJUSTMENT DEVICE AND CURTAIN WITH THE SAME

CROSS REFERENCE OF RELATED APPLICATION

This is a U.S. National Stage under 35 U.S.C 371 of the International Application PCT/CN2020/114949, filed Sep. 14, 2020, which claims priority under 35 U.S.C. 119(a-d) to CN 201910875903.7, filed Sep. 17, 2019.

BACKGROUND OF THE PRESENT INVENTION

Field of Invention

The present invention relates to a rotary positioning adjustment device and a curtain with the rotary positioning adjustment device.

Description of Related Arts

In spite that the shutter increases the privacy of a room, potential dangers exist. For example, a lifting and circulating drawstring with a vertical handle is installed on a side of the traditional manual shutter. Since the drawstring is free from the window, it is easy to cause accidental injury to children. In addition, the traditional manual drawstring is easy to damage the curtain due to different magnitudes and directions of the user's force, which reduces the service life of the shutter.

In order to avoid unnecessary injury to children caused by the lifting and circulating drawstring. There are shutters without drawstring on the market. For example, the Chinese patent with the patent number of ZL 201520648804.2 discloses a positioning adjustment mechanism for roller shutters, which includes a positioning rod, a positioning sleeve, an insertion rod, a reel connection sleeve and a mounting seat, wherein one end of the insertion rod is provided with a plug which is plugged in the mounting seat, another end of the insertion rod is movably sleeved with the reel connection sleeve and is connected with one end of the positioning rod, the positioning rod is movably provided with the positioning sleeve, another end of the positioning rod is provided with the positioning seat. The mounting seat is an adjustable damping mounting seat, which includes a base, a damping spring and an adjusting wheel part. The base includes a base sleeve part and a baffle part provided at one end of the base sleeve part, a middle portion of the baffle part has a base through hole, the baffle part has two base installation holes, the damping spring is tightly sleeved on the base sleeve part of the base, the adjusting wheel part is in concentrical movable connection with the base through the base through hole, one end of the adjusting wheel part is in clamped connection with the damping spring, another end of the adjusting wheel part has an insertion hole and is engaged with the plug of the insertion rod. The positioning adjustment mechanism for roller shutters is beneficial to the positioning and adjustment of the curtain fabric when installing and using the curtain. However, the positioning adjustment mechanism has poor positioning effect and low versatility.

SUMMARY OF THE PRESENT INVENTION

To overcome shortcomings and deficiencies of the prior art, the present invention provides a rotary positioning adjustment device and a curtain with the same, in which the adjustment device is accurate in positioning, long in service life, high in generality and privacy.

To achieve the above object, the present invention provides a first technical solution as below. A rotary positioning adjustment device comprises a shaft sleeve and a connecting rod, wherein one end of the connecting rod is provided with a reel, the reel is rotatably located within a fixed seat, another end of the connecting rod passes through the fixed seat, a rotary casing, a first spring seat, a first torsion spring and a second spring seat in sequence; the first spring seat is sleeved on the rotary casing; the first torsion spring is installed within the second spring seat; a first free connection part of the first torsion spring is inserted into an insertion slot of the second spring seat, a second free connection part of the first torsion spring is inserted into an opening slot of the connecting rod.

Preferably, a power storage assembly is installed within the shaft sleeve; the power storage assembly comprises a power input piece, a second torsion spring and a power output piece; the second torsion spring is located between the power input piece and the power output piece.

Preferably, a first support leg of the second torsion spring is rotatably connected with one side of an input block of the power input piece in a hooked mode, a second support leg of the second torsion spring is rotatably connected with another side of the input block of the power input piece in the hooked mode.

Preferably, a connection end of the power output piece is provided with an output block which is corresponding to the input block, the second torsion spring is simultaneously sleeved on the input block and the output block.

Preferably, a power output end of the power output piece has a notch, the reel has an axially protruding connection part which is able to be rotatably inserted into the notch.

Preferably, a center of the power input piece is provided with a cylindrical boss, a center of the cylindrical boss has a positioning hole, the connection end of the power output piece is provided with a positioning column which fits with the positioning hole.

Preferably, a circumferential outer wall of a middle portion of the reel is provided with a circumferential flange.

Preferably, the fixed seat is set within the rotary casing, the shaft sleeve is inserted into the fixed seat in a pluggable mode.

Preferably, a circumferential outer wall of the rotary casing has a first positioning connection groove, the first spring seat is provided with a first positioning connection column which fits with the first positioning connection groove.

Preferably, the first spring seat has a second positioning connection groove, the second spring seat is provided with a second positioning connection column which fits with the second positioning connection groove.

Preferably, a circumferential outer wall of a top portion of the shaft sleeve is provided with multiple locating pins which are spacedly distributed, a circumferential inner wall of a top portion of the fixed seat has multiple locating grooves which fit with the multiple locating pins respectively.

Preferably, a circumferential outer wall of the second spring seat is provided with a second external clamping part which is corresponding to a first external clamping part of the first spring seat.

Preferably, the first spring seat and the second spring seat are sleeved with an aluminum pass pipe, the aluminum pass pipe has a positioning recess, the aluminum pass pipe contacts with the first external clamping part and the second external clamping part through the positioning recess.

Preferably, the shaft sleeve is provided with a circumferential connection flange, the shaft sleeve is fixedly connected with an upper beam cover through the circumferential connection flange.

Preferably, the upper beam cover has a round through hole which fits with a power input end of the power input piece.

Preferably, an end surface of the power input end of the power input piece has a polygon groove.

Preferably, the connection part of the reel has a polygon outer contour which fits with the polygon groove.

Preferably, the first torsion spring is a flat spiral spring.

Preferably, the second torsion spring is a constant-force torsion spring.

Preferably, a fixed cutting with curtain fabric is movably inserted into the positioning recess.

Preferably, the polygon groove is a non-circular groove.

A second object of the present invention is to provide a curtain with the rotary positioning adjustment device.

Compared with the prior art, the present invention has advantages as follows. Through a combined action of the first torsion spring and the second torsion spring, the rotary positioning adjustment device provided by the present invention achieves positioning adjustment for curtains and has high stability. Moreover, the connecting rod adopts the screw structure, a nut is provided on the connecting rod with the screw structure. Through locking the nut, the degree of tightness of the rotary positioning adjustment device is adjusted or fixed, thereby effectively ensuring the service life and effect of the curtains.

DETAILED DESCRIPTION OF THE PREFERRED EMBODIMENT

Figure 1:
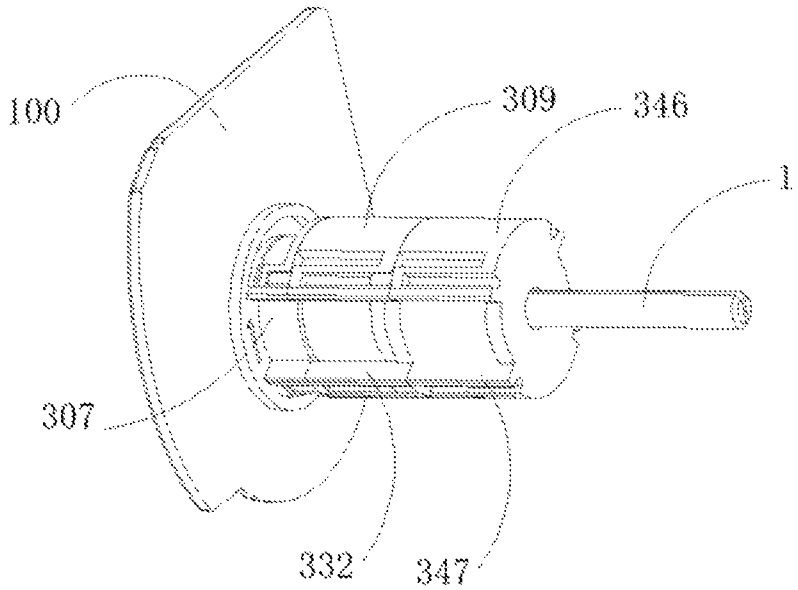
FIG. 1 is a three-dimensional structural diagram of a rotary positioning adjustment device with an upper beam cover provided by the present invention.

The embodiment of the present invention is further described in detail with accompanying drawings as follows.

It should be noted that unless otherwise expressly specified and limited, the terms “limitation”, “installation”, “connection” and “connected” should be understood in a broad sense, for example, it may be a fixed connection, a detachable connection, or an integral connection; it also may be a mechanical connection or an electrical connection; it also may be a direct connection, an indirect connection through an intermediate medium, or an internal communication between two components. For those skilled in the art, the specific meanings of the above terms in the present invention are able to be understood through specific situations.

In the description of the preferred embodiments of the present invention, it should be understood that the terms “central”, “radial”, “axial”, “upper”, “lower”, “front”, “rear”, “left”, “right”, “vertical”, “horizontal”, “top”, “bottom”, “inside”, “outside” and other indicated orientations or positional relationships are based on the orientations or positional relationships shown in the drawings, which is only for the convenience of describing the present invention and simplifying the description, rather than indicating or implying that the device or component referred to must have a particular orientation, must be constructed and operated in a particular orientation, and therefore these terms should not be construed as a limitation of the present invention. In addition, the terms “first”, “second”, etc. are only used for descriptive purposes, and should not be understood as indicating or implying relative importance or indicating the number of technical features indicated. Therefore, the definition of “first”, “second”, etc. features may expressly or implicitly include one or more technical features. In the description of the present invention, unless otherwise specified, “multiple” means two or more.

First Embodiment

Figure 2:
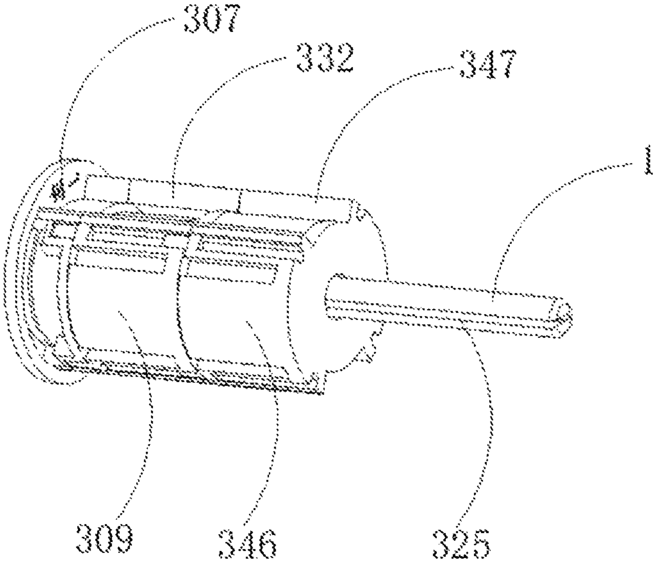
FIG. 2 is a three-dimensional structural diagram of a rotary positioning adjustment device without an upper beam cover provided by the present invention.
Figure 3:
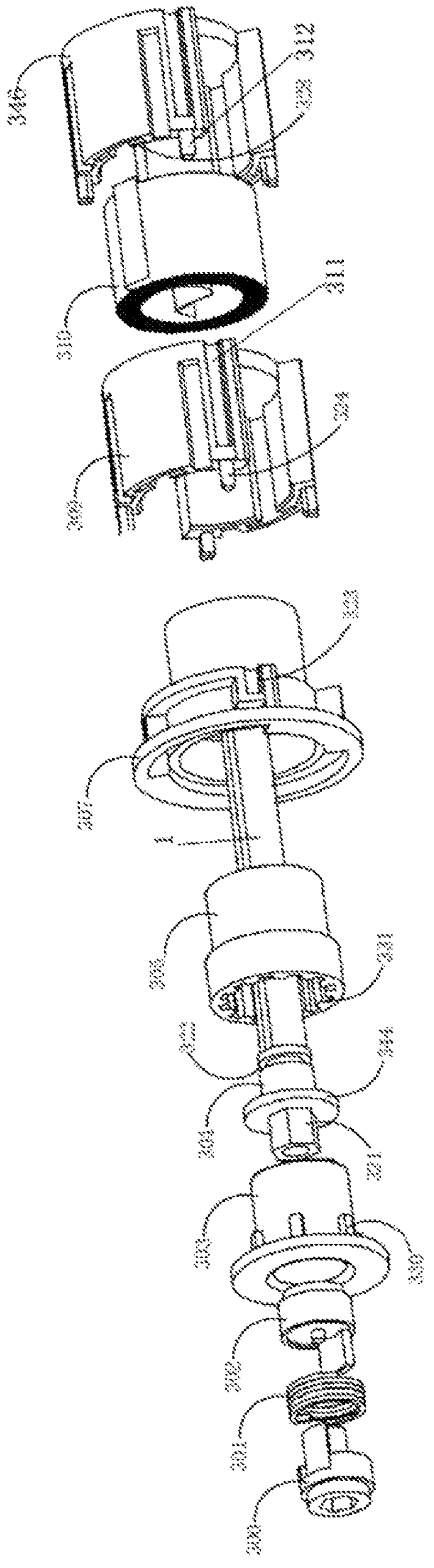
FIG. 3 is an exploded view of the rotary positioning adjustment device shown in FIG. 2.
Figure 4:
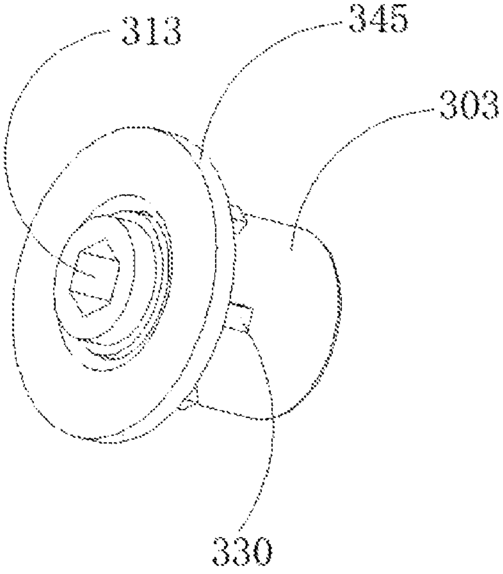
FIG. 4 is a three-dimensional structural diagram of a shaft sleeve with power storage assembly of the rotary positioning adjustment device shown in FIG. 1.
Figure 5:
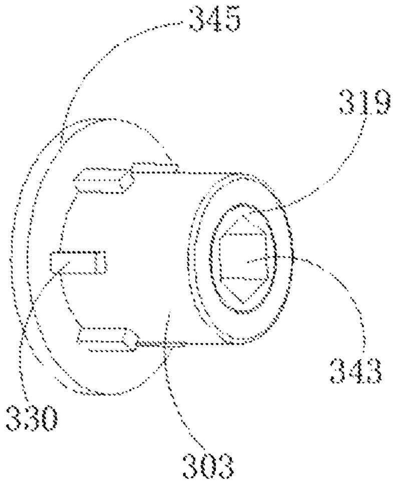
FIG. 5 is a three-dimensional structural diagram of a shaft sleeve with power storage assembly of the rotary positioning adjustment device shown in FIG. 2.
Figure 6:
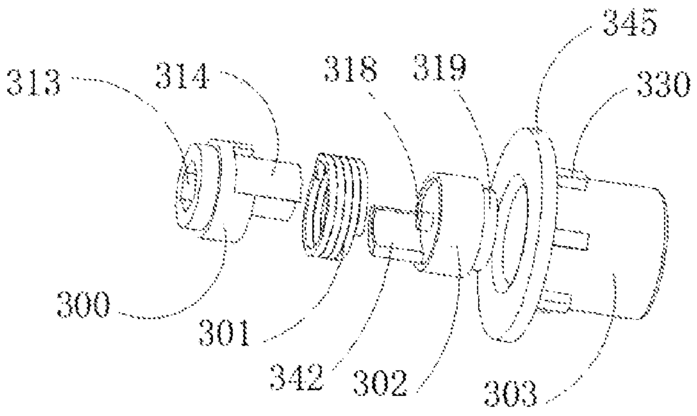
FIG. 6 is an exploded view of FIG. 4 or FIG. 5.
Figure 7:
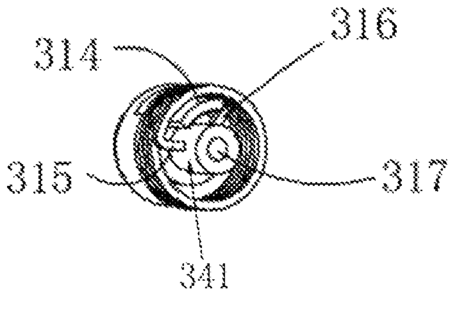
FIG. 7 is an installation diagram of a torsion spring shown in FIG. 6.
Figure 8:
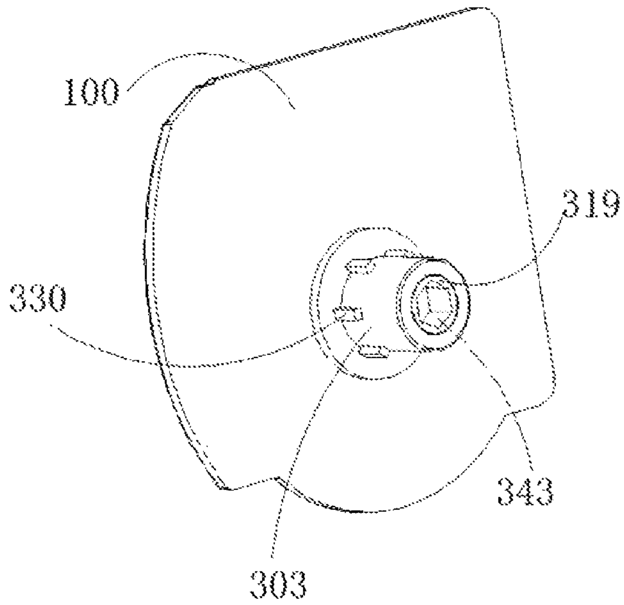
FIG. 8 is a three-dimensional structural diagram of an upper beam cover with the shaft sleeve shown in FIG. 1.
Figure 9:
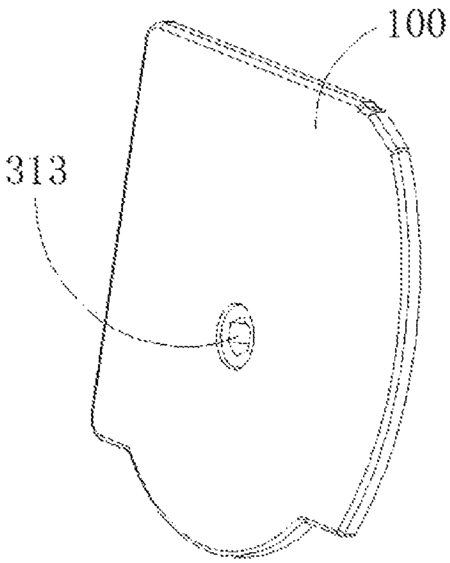
FIG. 9 is another three-dimensional structural diagram of an upper beam cover with the shaft sleeve shown in FIG. 1.
Figure 10:
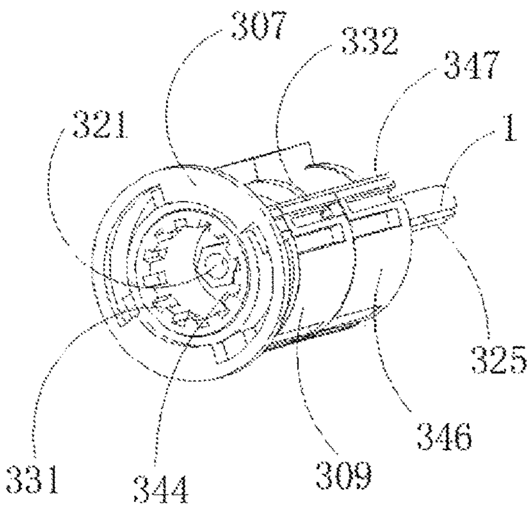
FIG. 10 is a three-dimensional structural diagram of the rotary positioning adjustment device without the upper beam cover shown in FIG. 2.
Figure 11:
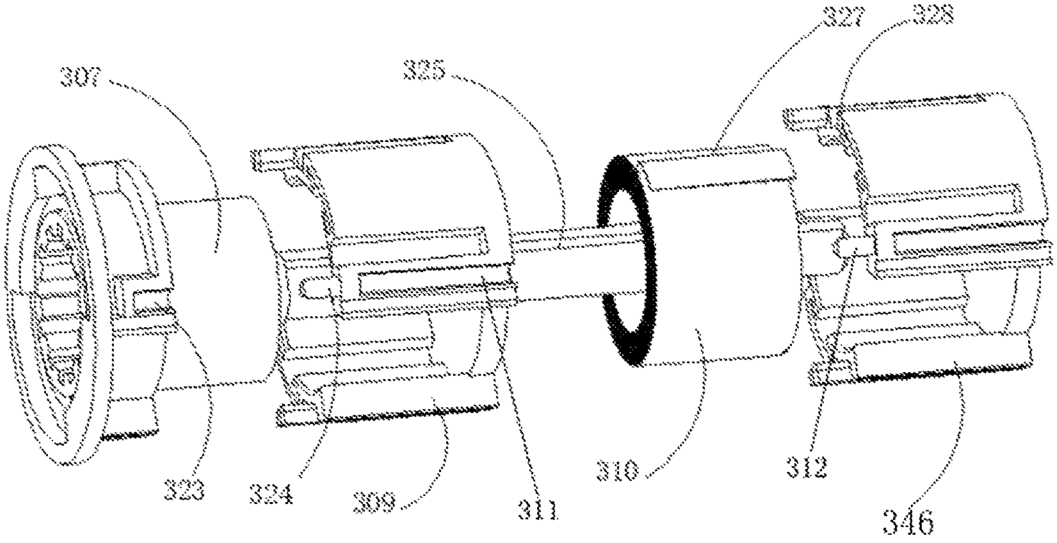
FIG. 11 is an exploded view of FIG. 10.
Figure 12:
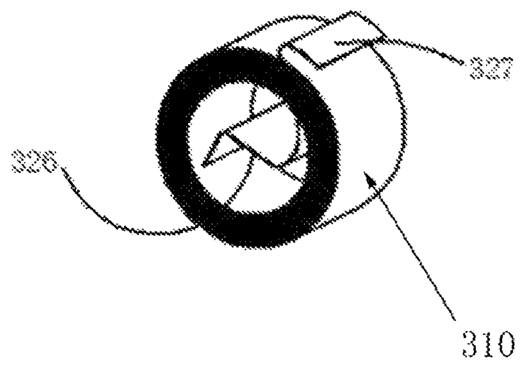
FIG. 12 is a structural diagram of a first torsion spring shown in FIG. 11.
Figure 13:
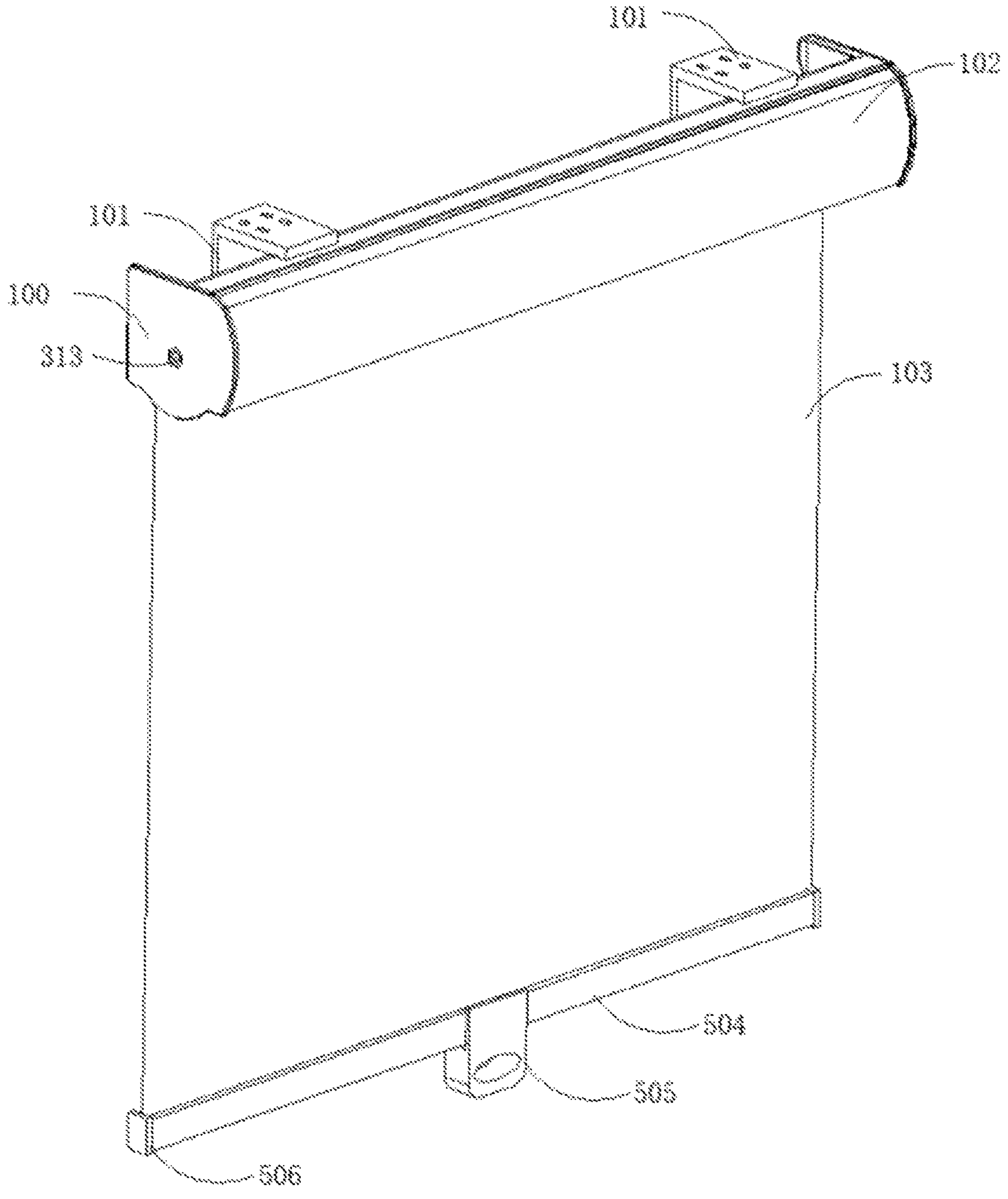
FIG. 13 is a structural diagram of a curtain with the rotary positioning adjustment device provided by the present invention.
Figure 14:
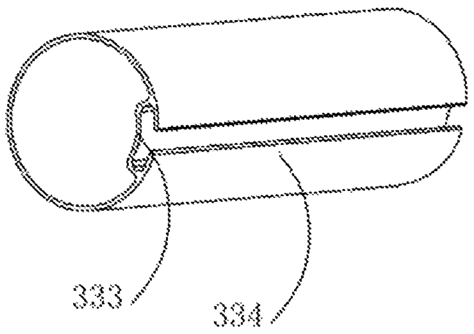
FIG. 14 is a three-dimensional structural diagram of an aluminum pass pipe shown in FIG. 13.

Referring to FIGS. 1 to 14, a rotary positioning adjustment device for a shutter according to a first embodiment of the present invention is illustrated, wherein the rotary positioning adjustment device comprises a shaft sleeve 303, a connecting rod 1, a reel 304, a fixed seat 305, a rotary casing 307, a first spring seat 309 and a second spring seat 346. The connecting rod 1 has an opening slot 325 axially provided thereon. A length of the opening slot 325 is smaller than a length of the connecting rod 1. The reel 304 is fixedly connected with an end portion of the connecting rod 1. The fixed seat 305 is sleeved on the reel 304. The reel 304 is rotatably located within the fixed seat 305. The reel 304 is located at one end of the connecting rod 1 and is rotatably located within the fixed seat 305. Another end of the connecting rod 1 with the reel 304 passes through the fixed seat 305, the rotary casing 307, the first spring seat 309 and the second spring seat 346 in sequence. According to the first embodiment, the connecting rod 1 is made of plastic materials or metal materials. In order to reduce the overall weight of the rotary positioning adjustment device, the connecting rod 1 is made of aluminum alloy. A first torsion spring 310 is installed within the second spring seat 346. According to the first embodiment, the first torsion spring is a flat spiral spring. A first free connection part 327 of the first torsion spring 310 is inserted into an insertion slot 328 of the second spring seat 346, and a second free connection part 326 of the first torsion spring 310 is inserted into the opening slot 325 of the connecting rod 1.

A power storage assembly is installed within the shaft sleeve 303. The power storage assembly, having a cylindrical structure, fits with a cylindrical chamber of the shaft sleeve. While being installed, the power storage assembly is integrally inserted into the cylindrical chamber of the shaft sleeve. The power storage assembly comprises a power input piece 300, a second torsion spring 301 and a power output piece 302. The power input piece 300 and the power output piece 302 are both made of plastic materials, such as polyester. According to the first embodiment of the present invention, the second torsion spring 301 is a constant-force torsion spring. The second torsion spring 301 is located between the power input piece 300 and the power output piece 302. During assembly, a first support leg 315 of the second torsion spring 301 is hooked on one side of an input block 314 of the power input piece 300, and a second support leg 316 of the second torsion spring 301 is hooked on the other side of the input block 314. An output block 342 corresponding to the input block 314 is located at a connection end of the power output piece 302. A center of a cylindrical boss 341 of the power input piece 300 has a positioning hole 317. A positioning column 318 fitted with the positing hole 317 is set at a center of a connection end of the power output piece 302. Moreover, the connection end of the power output piece 302 is provided with the output block 342 which is corresponding to the input block 314. After the power input piece 300 is assembled with the power output piece 302 through the second torsion spring 301, the positioning column 318 is coaxially aligned with the positioning hole 317, the second torsion spring 301 is simultaneously sleeved on the input block 314 of the power input piece 300 and the output block 342 of the power output piece 302. The input block 314 is provided at a periphery of the cylindrical boss 341. Similarly, the output block 342 is provided at a periphery of the positioning column 318. The power input piece 300 is integrated with the input block 314. Similarly, the power output piece 302 is integrated with the output block 342. The above-mentioned design is able to improve the stability of torque transmission. According to the first embodiment of the present invention, the first torsion spring 310 has a left-handed structure, and the second torsion spring 301 has a right-handed structure. Or, the first torsion spring 310 has a right-handed structure, and the second torsion spring 301 has a left-handed structure.

Both the input block 314 and the output block 342 have an arc-shaped sheet structure. A power output end 319 of the power output piece 302 has a non-circular notch 343. The reel 304 has an axially protruding connection part 321. The connection part 321 is able to be detachably inserted into the non-circular notch 343 of the power output end 319 of the power output piece 302. The power output piece 302 drives the reel 304 of the connecting rod 1 to rotate. The connection part 321 has a polygonal outer contour. The non-circular notch 343 matches with the polygonal outer contour of the connectio344*n* part 321.

A circumferential outer wall of a middle portion of the reel 304 is provided with a circumferential flange 344. The circumferential flange 344 contacts with a circumferential inner wall of the fixed seat 305 for support and limit. A circumferential outer wall of a tail portion of the reel 304 is provided with a circumferential recess 322. The shaft sleeve 303 is detachably inserted into the fixed seat 305. A circumferential outer wall of a top portion of the shaft sleeve 303 is provided with multiple locating pins 330 spacedly distributed. A circumferential inner wall of a top portion of the fixed seat 305 is provided with multiple locating grooves 331 which are corresponding to and fit with the multiple locating pins 330 one to one. After the shaft sleeve 303 is assembled with the fixed seat 305, the locating pins 330 are inserted into the locating grooves 331 respectively. The locating pins 330 are axially arranged and parallel to an axial line of the shaft sleeve 303.

The fixed seat 305 is fixedly sleeved with the rotary casing 307 and the fixed seat 305 is set in the rotary casing 307. The fixed seat 305 has a cylindrical structure. A circumferential outer wall of the rotary casing 307 has at least one first positioning connection groove 323. The rotary casing 307 is sleeved with the first spring seat 309. The first spring seat 309 is provided with a first positioning connection column 324 which cooperates with the first positioning connection groove 323. After the rotary casing 307 is assembled with the first spring seat 309, the first positioning connection column 324 is inserted into the first positioning connection groove 323. The first spring seat 309 has a second positioning connection slot 311, the second spring seat 346 is provided with a second positioning connection column 312 which fits with the second positioning connection slot 311.

A circumferential outer wall of the first spring seat 309 is provided with a first external clamping part 332 which radially protrudes and is axially arranged. A circumferential outer wall of the second spring seat 346 is provided with a second external clamping part 347 which is corresponding to the first external clamping part 332 on the first spring seat 309. Similarly, the second external clamping part 347 is provided on the circumferential outer wall of the second spring seat 346, the arrangement manner is as same as the first external clamping part 332. All of the rotary casing 307, the first spring seat 309 and the second spring seat 346 are simultaneously sleeved with an aluminum pass pipe 334. The aluminum pass pipe 334 has an inwardly protruding positioning recess 333. The aluminum pass pipe 334 contacts with the first external clamping part 332 and the second external clamping part 347 through the positioning recess 333. After the aluminum pass pipe 334 is assembled with the rotary casing 307, the first spring seat 309 and the second spring seat 346, the positioning recess 333 contacts with the first external clamping part 332 and the second external clamping part 347, and limits the rotation of the aluminum pass pipe 334 through the first external clamping part 332 and the second external clamping part 347.

The shaft sleeve 303 is fixedly connected with an upper beam cover 100 through a circumferential connection flange 345, and is fixed by screws, bolts, or bonding. The upper beam cover 100 has a round through hole which fits with the power input end of the power input piece 300. The power input end is able to pass through the round through hole. An end surface of the power input end of the power input piece 300 has a polygon groove 313. While assembling a curtain, two upper beam covers 100 are installed at a left side and a right side of a window respectively. Accordingly, in the first embodiment, there are two rotary positioning adjustment devices for the curtain. One of the two rotary positioning adjustment devices is connected with an upper beam cover 100 at the left side of the window, the other of the two rotary positioning adjustment devices is fixedly connected with an upper beam cover 100 at the right side of the window. The positioning recess 333 of the aluminum pass pipe 334 is adapted to different curtains, such as roller blinds, honeycomb blinds, pleated blinds, zebra blinds, and Roman blinds.

Second Embodiment

A roller shutter with a rotary positioning adjustment device according to a second embodiment provided by the present invention comprises the rotary positioning adjustment device disclosed by the first embodiment, a lower beam cover 506, a curtain fabric 103, a lower beam 504 and an upper beam 102. The roller shutter is fixedly installed on a top plane of a window through two installation pieces 101 which are fixed on the upper beam 102. The lower beam 504 is provided with a handle 505. Two lower beam covers 506 are provided at two ends of the lower beam 504 respectively.

Third Embodiment

Figure 15:
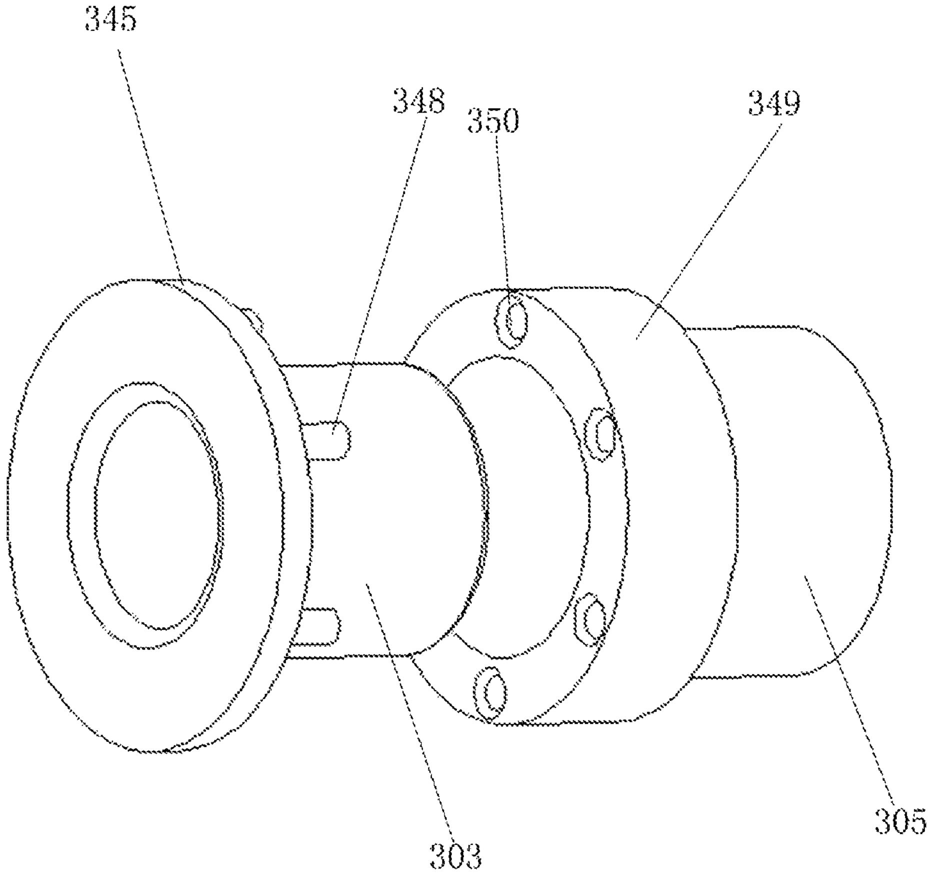
FIG. 15 is a three-dimensional structural diagram of assembling the shaft sleeve with the fixed seat of the rotary positioning adjustment device according to another embodiment of the present invention.

Referring to FIGS. 1 to 12 and 14 to 15, the differences between the first embodiment and the third embodiment are as follows. The third embodiment removes the assembly structure of the locating pins 330 and the locating grooves 331, and adopts the connection poles 348 and the connection holes 350 to achieve the assembly of the shaft sleeve 303 and the fixed seat 305. Specifically, multiple connection poles 348 are fixed on a side wall of a circumferential connection flange, a circumferential outer wall of a top portion of the fixed seat 305 is provided with a radially protruding flange 349, a side wall of the radially protruding flange 349 has multiple connection holes 350 which fit with the connection poles 348 respectively.

The above are only the preferred embodiments of the present invention, and do not limit the present invention in any form. Any simple modifications, equivalent changes and modifications made to the above embodiments according to the technical essence of the present invention are still within the scope of the technical solution of the present invention.

After reading this specification, it is not difficult for those skilled in the art to see that the present invention consists of a combination of existing technologies. Some of these existing technologies that constitute various parts of the present invention are described in detail here, and some are not explained for the sake of brevity of the description, but those skilled in the art will know the present invention after reading the description. Moreover, it is not difficult for those skilled in the art to see that the present invention is full of creative work, and is the result of years of theoretical analysis and a large number of experiments by the inventor. Those skilled in the art also find from the description that each technical solution disclosed herein and any combination of various features belong to a part of the present invention.

What is claimed is:

1. A rotary positioning adjustment device, comprising a shaft sleeve and a connecting rod, wherein one end of the connecting rod is provided with a reel, the reel is rotatably located within a fixed seat, another end of the connecting rod passes through the fixed seat, a rotary casing, a first spring seat, a first torsion spring and a second spring seat in sequence; the first spring seat is sleeved on the rotary casing; the first torsion spring is installed within the second spring seat; a first free connection part of the first torsion spring is inserted into an insertion slot of the second spring seat, a second free connection part of the first torsion spring is inserted into an opening slot of the connecting rod.

2. The rotary positioning adjustment device according to claim 1, wherein a power storage assembly is installed within the shaft sleeve; the power storage assembly comprises a power input piece, a second torsion spring and a power output piece; the second torsion spring is located between the power input piece and the power output piece.

3. The rotary positioning adjustment device according to claim 2, wherein a first support leg of the second torsion spring is rotatably connected with one side of an input block of the power input piece in a hooked mode, a second support leg of the second torsion spring is rotatably connected with another side of the input block of the power input piece in the hooked mode.

4. The rotary positioning adjustment device according to claim 3, wherein a connection end of the power output piece is provided with an output block which is corresponding to the input block, the second torsion spring is simultaneously sleeved on the input block and the output block.

5. The rotary positioning adjustment device according to claim 2, wherein a power output end of the power output piece has a notch, the reel has an axially protruding connection part which is able to be rotatably inserted into the notch.

6. The rotary positioning adjustment device according to claim 2, wherein a center of the power input piece is provided with a cylindrical boss, a center of the cylindrical boss has a positioning hole, the connection end of the power output piece is provided with a positioning column which fits with the positioning hole.

7. The rotary positioning adjustment device according to claim 2, wherein a circumferential outer wall of a middle portion of the reel is provided with a circumferential flange.

8. The rotary positioning adjustment device according to claim 2, wherein the fixed seat is set within the rotary casing, the shaft sleeve is inserted into the fixed seat in a pluggable mode.

9. The rotary positioning adjustment device according to claim 2, wherein a circumferential outer wall of the rotary casing has a first positioning connection groove, the first spring seat is provided with a first positioning connection column which fits with the first positioning connection groove.

10. The rotary positioning adjustment device according to claim 9, wherein the first spring seat has a second positioning connection groove, the second spring seat is provided with a second positioning connection column which fits with the second positioning connection groove.

11. The rotary positioning adjustment device according to claim 1, wherein a circumferential outer wall of a top portion of the shaft sleeve is provided with multiple locating pins which are spacedly distributed, a circumferential inner wall of a top portion of the fixed seat has multiple locating grooves which fit with the multiple locating pins respectively.

12. The rotary positioning adjustment device according to claim 10, wherein a circumferential outer wall of the second spring seat is provided with a second external clamping part which is corresponding to a first external clamping part of the first spring seat.

13. The rotary positioning adjustment device according to claim 12, wherein the first spring seat and the second spring seat are sleeved with an aluminum pass pipe, the aluminum pass pipe has a positioning recess, the aluminum pass pipe contacts with the first external clamping part and the second external clamping part through the positioning recess.

14. The rotary positioning adjustment device according to claim 2, wherein the shaft sleeve is provided with a circumferential connection flange, the shaft sleeve is fixedly connected with an upper beam cover through the circumferential connection flange.

15. The rotary positioning adjustment device according to claim 14, wherein the upper beam cover has a round through hole which fits with a power input end of the power input piece.

16. The rotary positioning adjustment device according to claim 15, wherein an end surface of the power input end of the power input piece has a polygon groove.

17. The rotary positioning adjustment device according to claim 10, wherein the connection part has a polygon outer contour which fits with the polygon notch.

18. The rotary positioning adjustment device according to claim 13, wherein a fixed cutting with curtain fabric is movably inserted into the positioning recess.

19. The rotary positioning adjustment device according to claim 14, wherein multiple connection poles are fixed on a side wall of the circumferential connection flange, a circumferential outer wall of a top portion of the fixed seat is provided with a radially protruding flange, a side wall of the radially protruding flange has multiple connection holes which fit with the connection poles respectively.

20. A curtain comprising the rotary positioning adjustment device according to claim 1.

* * * * *